(12) United States Patent
Olbrisch et al.

(10) Patent No.: US 9,128,492 B2
(45) Date of Patent: Sep. 8, 2015

(54) REGULATORS HAVING AN ISOLATED LOADING CHAMBER AND BLOWOUT PREVENTION APPARATUS

(75) Inventors: Moritz Klaus Olbrisch, Hamburg (DE); Daryll Duane Patterson, Brooklyn Park, MN (US); Falk Rapsch, Lubeck (DE)

(73) Assignee: TESCOM CORPORATION, Elk River, MN (US)

( * ) Notice: Subject to any disclaimer, the term of this patent is extended or adjusted under 35 U.S.C. 154(b) by 578 days.

(21) Appl. No.: 13/207,186

(22) Filed: Aug. 10, 2011

(65) Prior Publication Data

US 2013/0037130 A1 Feb. 14, 2013

(51) Int. Cl.
*G05D 16/10* (2006.01)

(52) U.S. Cl.
CPC ........... *G05D 16/10* (2013.01); *Y10T 137/7758* (2015.04)

(58) Field of Classification Search
CPC .... G05D 16/10; G05D 16/103; G05D 16/106
USPC ............. 137/505.13, 505.38, 505.39, 505.42, 137/509, 377, 380, 382
See application file for complete search history.

(56) References Cited

U.S. PATENT DOCUMENTS

| | | | |
|---|---|---|---|
| 2,301,031 A | 11/1942 | Ferguson | |
| 2,522,913 A | 9/1950 | Westman | |
| 2,612,728 A | 10/1952 | Jacobsson | |
| 2,731,981 A | 1/1956 | Glasser | |
| 2,742,764 A | * 4/1956 | St Clair | 137/505.12 |
| 2,783,769 A | 3/1957 | Philbrick | |
| 2,806,481 A | 9/1957 | Faust | |
| 2,886,058 A | 5/1959 | Horton | |
| 3,153,424 A | 10/1964 | Acker et al. | |
| 3,196,901 A | 7/1965 | Phillipps | |

(Continued)

FOREIGN PATENT DOCUMENTS

| | | |
|---|---|---|
| DE | 2510235 | 9/1976 |
| FR | 1263971 | 5/1961 |

(Continued)

OTHER PUBLICATIONS

Imbo et al., Innovative Capillary Deliquification Safety System Resolves Liquid Loading Problems with a Cost-Effective Solution that Maximizes Production While Maintaining Well-Safety Requirements, SPE International, © 2010, 12 pages.

(Continued)

*Primary Examiner* — Eric Keasel
(74) *Attorney, Agent, or Firm* — Hanley, Flight & Zimmerman, LLC

(57) ABSTRACT

Fluid regulators are described. An example regulator includes a regulator body defining a sensing chamber between an inlet and an outlet of a fluid flow passageway of the fluid regulator. A bonnet is coupled to the regulator body and defines a loading chamber disposed adjacent the sensing chamber. The loading chamber is substantially sealed relative to the sensing chamber and an environment surrounding the fluid regulator. A sensor guide is disposed between the sensing chamber and the loading chamber and has at least one seal to fluidly isolate the loading chamber from the sensing chamber. The sensor guide has a vent flow path between the sensing chamber and the loading chamber to vent the sensing chamber during a failure condition of the at least one seal.

20 Claims, 4 Drawing Sheets

(56) References Cited

U.S. PATENT DOCUMENTS

| | | | |
|---|---|---|---|
| 3,272,224 A * | 9/1966 | Wrenshall | 137/382 |
| 3,338,638 A | 8/1967 | Kirk et al. | |
| 3,542,052 A | 11/1970 | Irwin | |
| 3,621,872 A * | 11/1971 | Fisher | 137/505.42 |
| 3,658,082 A | 4/1972 | DiTirro | |
| 3,757,816 A | 9/1973 | Price | |
| 3,906,982 A | 9/1975 | Fleischhacker et al. | |
| 3,926,204 A | 12/1975 | Earl | |
| 4,072,165 A | 2/1978 | Bradley, Jr. | |
| 4,111,222 A | 9/1978 | Hassell | |
| 4,274,490 A | 6/1981 | Huckaby | |
| 4,497,440 A | 2/1985 | Galloway | |
| 4,596,264 A | 6/1986 | Gladstone et al. | |
| 4,611,627 A | 9/1986 | Eidsvoog et al. | |
| 4,664,151 A * | 5/1987 | Piet | 137/625.66 |
| 4,693,267 A * | 9/1987 | Patterson | 137/505.42 |
| 4,909,269 A | 3/1990 | Pritchard et al. | |
| 5,129,551 A | 7/1992 | Gott | |
| 7,357,151 B2 | 4/2008 | Lonnes | |
| 2010/0276614 A1 | 11/2010 | Patterson et al. | |
| 2012/0266980 A1 | 10/2012 | Olbrisch et al. | |
| 2013/0000917 A1 | 1/2013 | Slack et al. | |

FOREIGN PATENT DOCUMENTS

| | | |
|---|---|---|
| FR | 2305667 | 10/1976 |
| GB | 649478 | 1/1951 |
| GB | 2308425 | 6/1997 |
| WO | 2012145128 | 10/2012 |

OTHER PUBLICATIONS

Tescom Industrial Controls, "26-1700 Series," Mar. 2007, 2 pages.
Tescom Europe GmbH & Co. KG, "Pressure Reducer Series 26-1700," Jul. 2008, 6 pages.
Halliburton, "Tubing-Retrievable Subsurface Safety Valves," 2008, 27 pages.
International Searching Authority, "International Search Report," issued in connection with international application serial No. PCT/US2012/030793, mailed Jun. 29, 2012, 2 pages.
International Searching Authority, "Written Opinion of the International Searching Authority," issued in connection with international application serial No. PCT/US2012/030793, mailed Jun. 29, 2012, 7 pages.
The United States Patent and Trademark Office, "Requirement for Restriction/Election," issued in connection with U.S. Appl. No. 13/090,770, mailed Aug. 9, 2013, 6 pages.
The United States Patent and Trademark Office, "Non-Final Office Action," issued in connection with U.S. Appl. No. 13/090,770, mailed Dec. 9, 2013, 24 pages.
United States Patent and Trademark Office, "Office Action," issued in connection with U.S. Appl. No. 13/090,770, mailed on Sep. 16, 2014, 36 pages.
The United States Patent and Trademark Office, "Final Office Action," issued in connection with U.S. Appl. No. 13/090,770, mailed May 21, 2014, 26 pages.
Mexican Patent Office, "Office Action," issued in connection with Mexican Patent Application No. MX/a/2014/001518, issued on Jan. 16, 2015, 4 pages.
United States Patent and Trademark Office, "Final Office Action," issued in connection with U.S. Appl. No. 13/090,770, mailed on Feb. 13, 2015, 28 pages.
International Searching Authority, "International Search Report", issued in connection with PCT Application No. PCT/US2012/049687, mailed on Oct. 5, 2010, 3 pages.
International Searching Authority, "Written Opinion", issued in connection with PCT Application No. PCT/US2012/049687, mailed on Oct. 5, 2010, 6 pages.
International Searching Authority, "International Preliminary Report on Patentability", issued in connection with PCT Application No. PCT/US2012/049687, mailed on Feb. 11, 2014, 7 pages.
United States Patent and Trademark Office, "Notice of Allowance," issued in connection with U.S. Appl. No. 13/090,770, mailed on Jun. 2, 2015, 24 pages.

* cited by examiner

REGULATORS HAVING AN ISOLATED LOADING CHAMBER AND BLOWOUT PREVENTION APPARATUS

FIELD OF THE DISCLOSURE

The present disclosure relates generally to fluid pressure regulators and, more particularly, to fluid pressure regulators having an isolated loading chamber and blowout prevention apparatus.

BACKGROUND

Process control systems commonly employ pressure regulators (e.g., back-pressure regulators) to control or maintain a pressure of a process fluid. Fluid regulators such as, for example, back-pressure regulators typically include a fluid valve assembly having a pressure sensor such as a piston to sense the pressure of a pressurized fluid at an inlet of the regulator. When the pressure of the pressurized fluid at the inlet exceeds a reference or set-point pressure (e.g., provided by the fluid regulator), the pressure sensor causes a flow control member of the fluid valve to move to an open position to allow fluid flow through the regulator body between the inlet and an outlet, which may be coupled to a lower pressure system utilizing the fluid, or to the atmosphere.

SUMMARY

Figure 1:
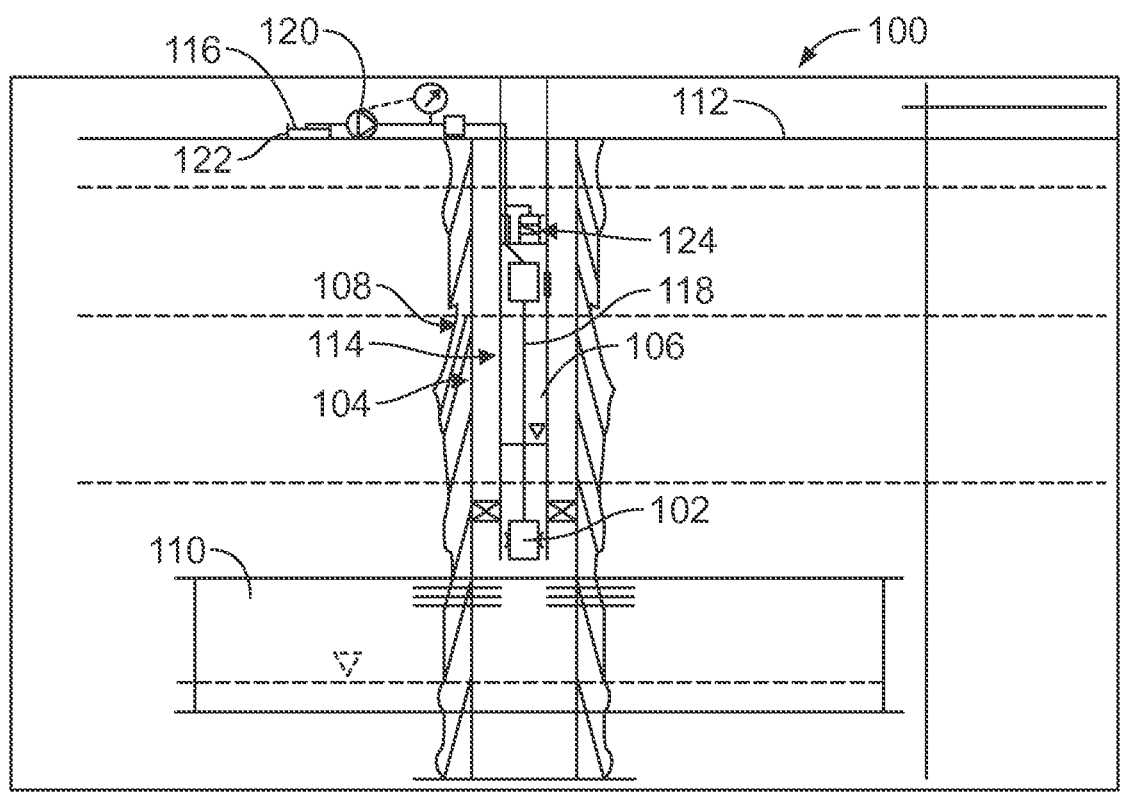
FIG. 1 illustrates a schematic diagram of a gas exploration application.

An example fluid regulator described herein includes a regulator body defining a sensing chamber between an inlet and an outlet of a fluid flow passageway of the fluid regulator. A bonnet is coupled to the regulator body and defines a loading chamber disposed adjacent the sensing chamber. The loading chamber is substantially sealed relative to the sensing chamber and the environment surrounding the fluid regulator. A sensor guide is disposed between the sensing chamber and the loading chamber and has at least one seal to fluidly isolate the loading chamber from the sensing chamber. The sensor guide has a vent flow path between the sensing chamber and the loading chamber to vent the sensing chamber during a failure condition of the at least one seal.

Another example fluid regulator described herein includes a sensor guide disposed between a sensing chamber of the fluid regulator and a loading chamber of the fluid regulator. The sensor guide has a vent flow path that is non-parallel relative to a longitudinal axis of the sensor guide. A first seal is disposed between the vent flow path and the loading chamber to prevent fluid flow or pressure to the loading chamber and a second seal is disposed between the vent flow path and the sensing chamber to prevent fluid flow or pressure between the sensing chamber and the vent flow path.

DETAILED DESCRIPTION

An example fluid regulator described herein isolates or seals a loading chamber defined by a housing of the example fluid regulator from a surrounding environment and/or a fluid flow path of the fluid regulator and includes blowout prevention apparatus. As a result, unlike known fluid regulators, a loading apparatus of an example fluid regulator described herein provides a pre-set pressure reference to a pressure sensor of the fluid regulator and is not influenced and/or affected by pressure fluctuations of a process fluid in the fluid flow passageway and/or a pressure of a fluid in the environment surrounding the fluid regulator. As a result, the example fluid regulators described herein provide significantly greater accuracy and/or reliability than many known fluid regulators.

To prevent over-pressurization of the loading chamber due to, for example, a seal failure, the example pressure regulators described herein include a safety or blowout prevention apparatus. In particular, the blowout prevention apparatus described herein operatively and/or fluidly isolates or decouples a sensing chamber of a pressure regulator and a loading chamber. In this manner, in the event of a seal failure between the sensing chamber and the loading chamber, the pressure of the fluid in the sensing chamber is vented to the atmosphere via the blowout prevention apparatus and does not flow within the loading chamber, thereby reducing the risk of damage to a body of the fluid regulator. However, in addition to fluidly isolating or decoupling a sensing chamber and a loading chamber and unlike known pressure regulators, the blowout prevention apparatus described herein isolates (e.g., via one or more seals) the loading chamber from external conditions and/or pressures and fluidly decouples a sensing chamber and a loading chamber of the fluid regulator.

As described herein, a fluid regulator may be a fluid control device to control or monitor a fluid property and/or characteristic such as, for example, a fluid flow rate, a pressure of a process fluid and/or any other fluid property or characteristic(s).

FIG. 1 is a schematic illustration of a hydrocarbon exploration application 100 (e.g., a gas/oil well exploration application) having a conventional or known back-pressure regulator or valve 102. A casing 104 is secured within a well 106 by cement 108 and extends in the well 106 to a gas/oil reservoir 110 below the Earth's surface 112 (e.g., 300 meters below the Earth's surface 112). A process fluid 116 (e.g., a foaming agent) may be injected within a tubing 114 via a process fluid line 118 and the pressure regulator 102 to cause the water and gas in the reservoir 100 to foam such that the foam rises to reduce an amount of water within the reservoir 110 and increase a fluid flow rate of the gas to the Earth's surface 112 along the tubing 114. A pump 120 pumps the process fluid 116 from a tank 122 to the reservoir 110 via the process fluid line 118 and the pressure regulator 102. The application 100 includes a Surface-controlled Subsurface Safety Valve 124 (ScSSV) to isolate wellbore pressures and fluids and prevent oil/gas flow through the tubing 114 and to the surface 112 in the event of a system failure.

Figure 2:
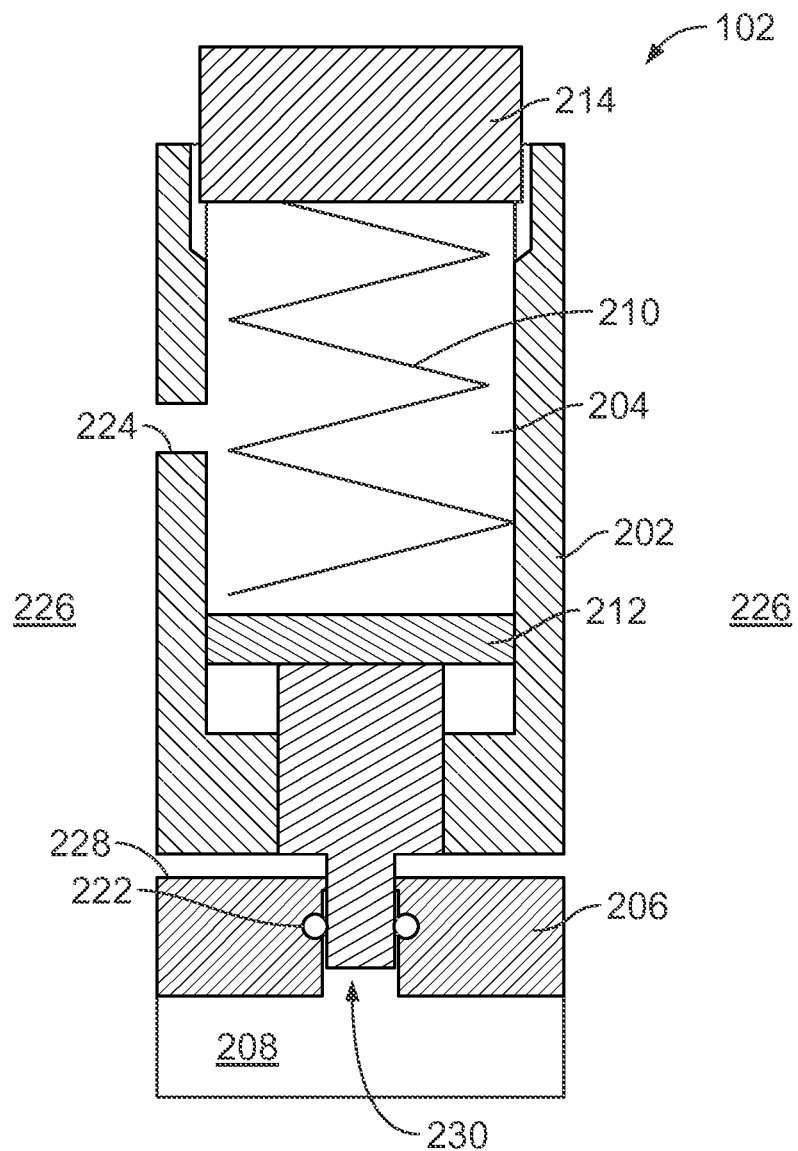
FIG. 2 depicts of a portion of a known back-pressure regulator that may be used with the gas exploration application of FIG. 1.

FIG. 2 is a cross-sectional view of a portion of the back-pressure regulator 102 of FIG. 1. The known regulator 102 includes a housing 202 defining a loading chamber 204 and a body 206 defining at least a portion of a sensing chamber 208. A load spring 210 is disposed within the loading chamber 204 between a pressure sensor 212 and a spring seat 214. The load spring 210 applies a force or load to the pressure sensor 212 that corresponds to a pre-set pressure setting of the fluid regulator 102. A seal 222 prevents fluid flowing from the sensing chamber 208 toward the loading chamber 204 during operation.

Referring also to FIG. 1, the pressure sensor 212 senses the upstream pressure of the pressurized process fluid 116 via the sensing chamber 208. The pressure sensor 212 causes the pressure regulator 102 to move between an open position and a closed position to provide a process fluid injection rate within the reservoir 110 based on a pre-set pressure setting provided by the load spring 210 of the regulator 102.

To prevent over-pressurization of the loading chamber 204 in the event of a seal failure, the regulator 102 includes a drill/vent 224 that is in fluid communication with an environment 226 surrounding the housing 202. In this manner, if the seal 222 fails, the fluid in the sensing chamber 208 (e.g., a relatively highly pressurized fluid) is vented to the environment 226 via the vent 224 to prevent damage to the pressure regulator 102 from a high pressure fluid flowing into the loading chamber 204.

However, fluid pressures within the well 106 are neither constant nor known. Due to the vent 224, such unknown pressures and/or pressure fluctuations within the well 106 can affect the accuracy of the pre-set pressure setting (e.g., can increase or decrease the pressure setting) provided by the loading spring 210 of the regulator 102 during operation. For example, external pressures affect the pre-set pressure setting of the pressure regulator 102 on a one-to-one ratio (e.g., an environmental pressure fluctuation of 10 psi can cause the pre-set pressure setting of the pressure regulator 102 to increase by 10 psi). As a result, the reliability and/or accuracy of the pressure regulator 102 may be compromised during operation, leading to unstable process fluid injection rates flowing into the reservoir 110.

To reduce the effect of pressure fluctuations in the environment 226 on the pre-set pressure setting provided by the load spring 210, the housing 202 also includes a vent 228 to reduce the effect of pressure fluctuations on the pre-set pressure setting of the pressure regulator 102. In this manner, the effect of pressure fluctuations in the environment 226 on the pressure sensor 212 and/or the load spring 210 is reduced because the pressure of the fluid in the environment acts on opposite sides of the piston sensor 212 (e.g., a partially pressure-balanced piston sensor 212). However, a sensing area between the opposite sides of the piston sensor 212 remains unbalanced. For example, an area such as, for example, an area 230 remains affected by the pressure fluctuations external to the pressure regulator 102 (e.g., pressures within the well 106) and, thus, may alter or affect the pre-set pressure setting of the pressure regulator 102. Thus, the vents 224 and 228 of the regulator 102 only reduce the effect or influence of the external pressures on the pre-set pressure setting, but fail to eliminate the effect. As a result, in some instances, the regulator 102 may be unreliable and may fail to provide a desired and/or accurate process fluid injection rate in the reservoir 110.

Figure 3:
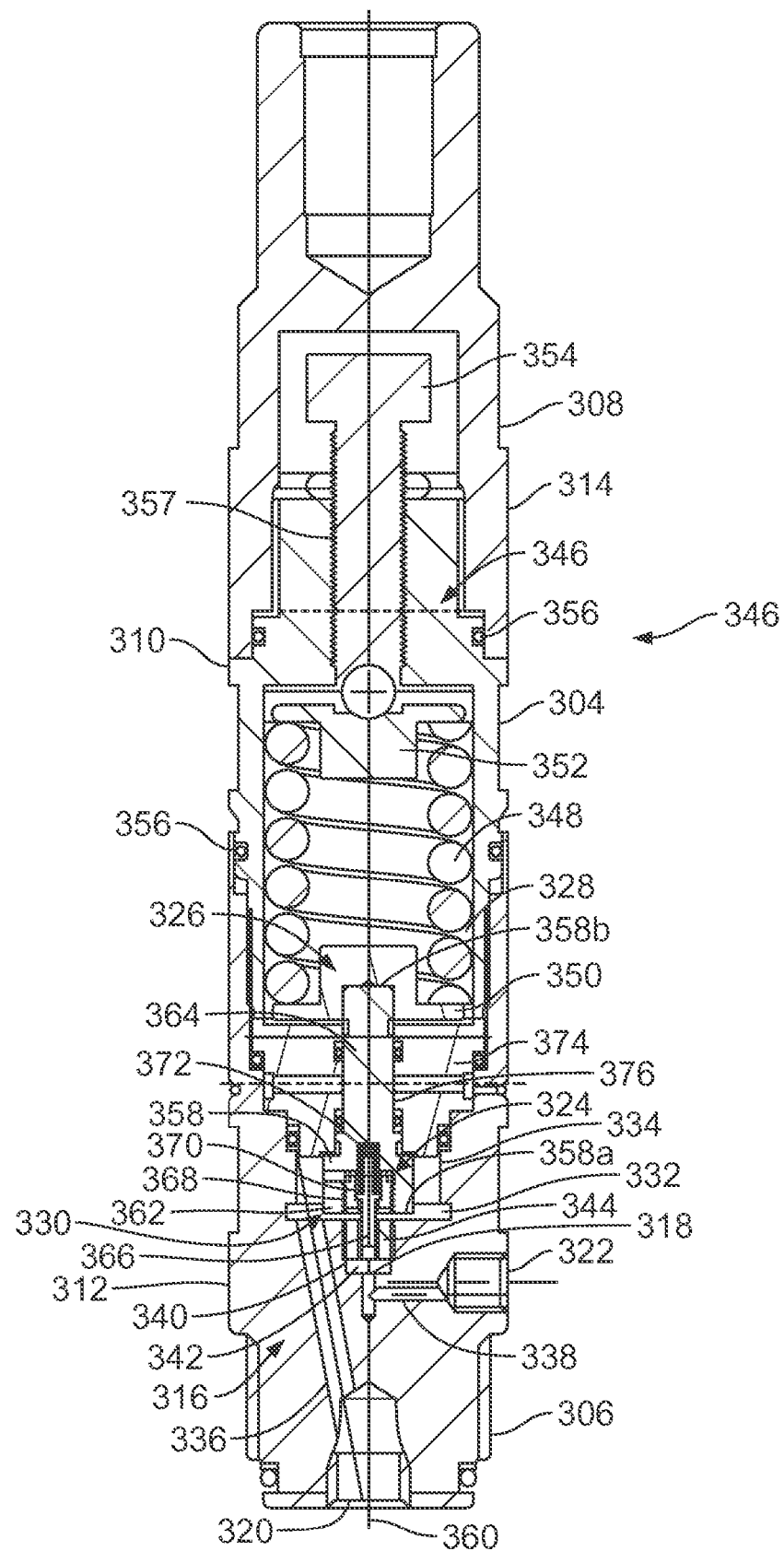
FIG. 3 is a cross-sectional view of an example back-pressure regulator described herein that may be used with the gas exploration application of FIG. 1.

FIG. 3 depicts an example back-pressure fluid regulator 300 described herein that can be used with, for example, the application 100 of FIG. 1 in place of the known pressure regulator 102. Unlike known fluid regulators, environmental conditions external to the fluid regulator 300 (e.g., external fluid pressures) do not influence or affect a pre-set pressure setting of the fluid regulator 300. The example fluid regulator 300 may be used, for example, to sense a pressure of a fluid upstream of the fluid regulator 300 to provide an injection rate of the process fluid based on a control or pre-set pressure of the fluid regulator 300, provide a shut-off mechanism when a pressure of a pressurized fluid system upstream from the fluid regulator 300 falls below a pre-set reference pressure or threshold value, etc.

The example regulator 300 shown in FIG. 3 includes a housing 302 having an upper body portion or bonnet 304 coupled (e.g., threadably coupled) to a lower body portion or regulator body 306. In this example, the housing 302 also includes a cap 308 that is coupled to the bonnet 304. As shown, the housing 302 has a cylindrical shape or profile when the regulator body 306 is coupled to the bonnet 304 such that an outermost surface 310 of the bonnet 304, an outermost surface 312 of the regulator body 306 and/or an outermost surface 314 of the cap 308 are substantially flush relative to one another when the regulator body 306 and the cap 308 are coupled to the bonnet 304.

The regulator body 306 defines a fluid flow path 316 having an orifice 318 between an inlet 320 and an outlet 322 of the fluid regulator 300. The inlet 320 may be fluidly coupled to a high pressure source upstream of the fluid regulator 300 (e.g., the pump side of the process fluid line 118 of FIG. 1) and the outlet 322 may be fluidly coupled to a low pressure system or source downstream from fluid regulator 300 (e.g., the reservoir 110 of FIG. 1). In other examples, the outlet 322 may be fluidly coupled another downstream fluid regulator, a valve, or any other downstream component or location.

A flow control assembly or sensor assembly 324 is captured between the regulator body 306 and the bonnet 304 so that a first side 326 of the flow control assembly 324 and the bonnet 304 define a loading chamber 328 and a second side 330 of the flow control assembly 324 and the regulator body 306 define a sensing chamber 332. In the illustrated example, the regulator body 306 has an annular wall 334 that defines a cavity to at least partially define the sensing chamber 332.

The fluid flow path 316 of the regulator body 306 includes a first passageway 336 to fluidly couple the inlet 320 and the sensing chamber 332 and a second passageway 338 to fluidly couple the sensing chamber 332 and the outlet 322. The regulator body 306 includes a recess or bore 340 between the second passageway 338 and the sensing chamber 332 to receive a valve seat 342 that defines the orifice 318 of the fluid flow path 316. A seat retainer 344 is disposed (e.g., threadably coupled) in the recess 340 to retain or capture the valve seat 342 within the recess 340.

To provide a pre-set load or force on the flow control assembly, the example fluid regulator 300 employs a load assembly 346. In this example, the load assembly 346 includes a biasing element 348 (e.g., a spring) disposed within the loading chamber 328 between a fixed spring seat 350 and an adjustable spring seat 352 and which provides a reference force or load (e.g., a pre-set force) on the flow control assembly 324. A spring adjuster 354 adjusts (e.g., increases or decreases) the amount of a preset force or load that the biasing element 348 exerts on the first side 326 of the flow control assembly 324. As shown, the spring adjustor 354 includes a screw that is threadably coupled to the bonnet 304 and engages the adjustable spring seat 350. Rotation of the spring adjustor 354 in a first direction (e.g., a clockwise direction) or a second direction (e.g., a counterclockwise direction) varies the amount of compression of the biasing element 348 (e.g., compresses or decompresses the biasing element 348) and, thus, the amount of load exerted on the first side 326 of the flow control assembly 324. The load provided by the biasing element 348 is adjusted to correspond to a desired pre-set pressure of the fluid regulator 300 and is transferred to the flow control assembly 324 via the fixed spring seat 350.

Although not shown, in other examples, a load within the loading chamber 328 (e.g., to a pressure sensor) may be provided via a control fluid (e.g., hydraulic oil, compressed air, etc.) instead of the biasing element 348. For example, the bonnet 304 may include a loading fluid passageway or port to fluidly couple a control fluid to the loading chamber 328.

Unlike known fluid regulators, the fluid regulator 300 includes one or more seals 356 disposed between the regulator body 306 and the bonnet 304 and/or the bonnet 304 and the cap 308 to isolate or seal an inner surface of the housing 302 such as the loading chamber 328 from environmental conditions external to the fluid regulator 300 (e.g., external fluid pressures). In some examples, a seal may be disposed between the bonnet 304 and the spring adjustor 354 (e.g., if the cap 308 is not provided). For example, the spring adjustor 354 may include a non-threaded portion to interface with a seal. The seal may be disposed within a groove of the non-threaded portion of the spring adjustor 354 and/or an aperture 357 (e.g., a non-threaded aperture) of the bonnet 304. As a result, environmental conditions (e.g., fluid pressures) external to the fluid regulator 300 do not affect the accuracy of the load assembly 346.

As shown in FIG. 3, the flow control assembly 324 includes a pressure sensor 358 having a first pressure sensing face or surface 358a (e.g., an area) to sense a pressure of a process fluid within the sensing chamber 332 and a second pressure sensing face or surface 358b to sense a pressure or force provided by the load assembly 346. The force of the load assembly 346 is applied to the second sensing surface 358b of the pressure sensor 358 via the spring seat 350. The sensing surfaces 358a and 358b are both substantially perpendicular relative to a longitudinal axis 360 of the housing 302.

In the illustrated example, the pressure sensor 358 is a cylindrical, elongate body or stem having a first stem end or piston head 362 to define the first sensing surface 358a and a second stem end 364 to define the second sensing surface 358b. In this example, the second stem end 364 has a reduced profile or diameter compared to the first stem end 362.

The pressure sensor 358 moves a poppet 366 relative to the valve seat 342 to control fluid flow through the fluid flow path 316. In particular, the pressure sensor 358 includes an opening or retainer cavity 368 adjacent the sensing surface 358a to receive the poppet 366. A retainer 370 is coupled to the retainer cavity 368 via, for example, threads and retains the poppet 366 and a biasing element 372 within the retainer cavity 368. The retainer 370 is a cylindrical body having an aperture to slidably receive the poppet 366.

The biasing element 372 has a spring rate that is significantly less than the spring rate of the biasing element 348. Unlike known regulators, which include a poppet integrally formed with a stem portion, the biasing element 372 enables the poppet 366 to move relative to the pressure sensor 358. As a result, the biasing element 372 prevents the poppet 366 from forcibly engaging the valve seat 342 during pressure fluctuations in the fluid flow path 316 and/or when the fluid regulator 300 moves to a closed position, thereby preventing or significantly reducing damage to the poppet 366 and/or the valve seat 342 (e.g., when the valve seat 342 and/or the poppet 366 are composed of a soft or brittle material such as tungsten carbide).

To guide the pressure sensor 358 and/or the poppet 366, the fluid regulator 300 includes a sensor guide or blowout prevention apparatus 374. As shown, the second stem end 364 of the pressure sensor 358 is slidably disposed within a bore 376 of the sensor guide 374 and extends into at least a portion of the loading chamber 328. The first stem end 362 slides or moves within the sensing chamber 332 as the second stem end 364 slides or moves within the bore 376. As described below, the sensor guide 374 (e.g., via one or more seals) also fluidly isolates or decouples the loading chamber 328 and the sensing chamber 332 and prevents a blowout condition (e.g., via a vent).

In operation, a high pressure fluid source fluidly coupled to the inlet 320 provides pressurized fluid to the sensing chamber 332 via the first passageway 336. With a reference pressure provided via the load assembly 346, the sensing chamber 332 senses a pressure of the pressurized fluid at the inlet 320. In turn, a pressure differential across the pressure sensor 358 provided by the fluid in the sensing chamber 332 and the force of the load assembly 346 causes the flow control assembly 214 to move relative to the valve seat 342.

For example, a pressure of the process fluid upstream of the inlet 320 sensed by the sensing chamber 332 that applies a force to the pressure sensor 358 greater than the pre-set load or force provided by the load assembly 346 moves the pressure sensor 358 and, thus, the poppet 366 away from the valve seat 342 (e.g., an open position) to allow process fluid (e.g., the process fluid 116 of FIG. 1) to flow between the inlet 320 and the outlet 322. When the pressure of the process fluid applies a force to the pressure sensor 358 that is less than the pre-set load or force provided by the load assembly 346, the pressure sensor 358 moves toward the poppet 366 so that the poppet 366 engages the valve seat 342 (e.g., a closed position) to prevent fluid flow between the inlet 320 and the outlet 322.

Figure 4:
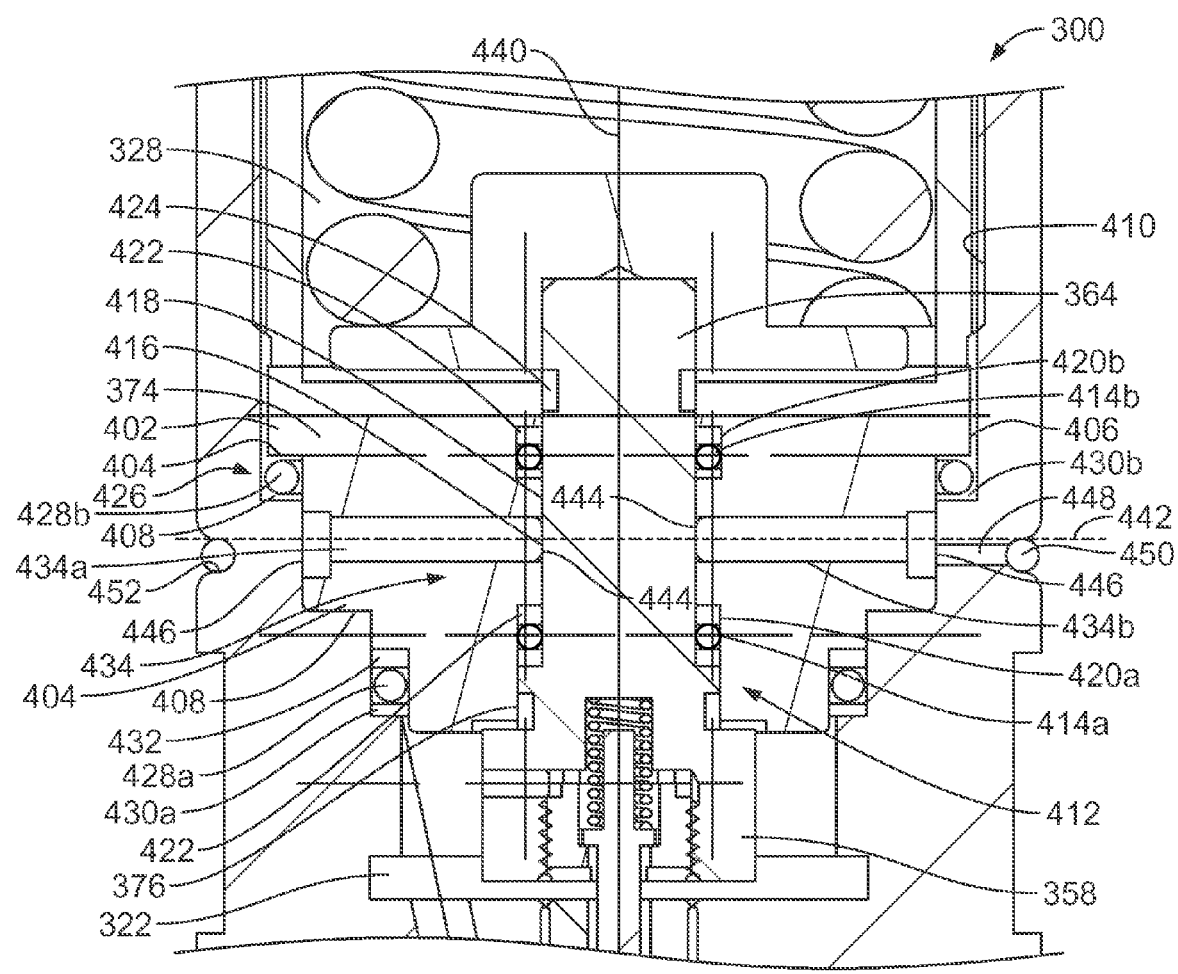
FIG. 4 is an enlarged cross-sectional view of a portion of the example back-pressure regulator of FIG. 3.

FIG. 4 illustrates an enlarged, partial cross-sectional view of the example fluid regulator 300 of FIG. 3. As shown in FIG. 4, the sensor guide 374 is disposed between the loading chamber 328 and the sensing chamber 332 to isolate, separate or otherwise fluidly decouple the loading chamber 328 from the sensing chamber 332. The sensor guide 374 of the illustrated example is a cylindrical body 402 having a plurality of stepped portions 404 about a peripheral edge or surface 406 of the body 402. The stepped portions 404 align with and/or engage (e.g., matably engage) respective stepped portions 408 disposed formed on an inner surface 410 of the regulator body 306 when coupled to the fluid regulator 300.

To fluidly isolate or decouple the loading chamber 328 and the sensing chamber 332, the sensor guide 374 employs a first seal assembly 412 (e.g., a dynamic seal assembly) disposed within the bore 376 adjacent the second stem end 364. The first seal assembly 412 includes first and second seals 414a-b (e.g., dynamic seals or O-rings) adjacent the second stem end 364 of the pressure sensor 358 to provide a substantially tight seal between an outer surface 416 of the second stem end 364 and an inner surface 418 of the bore 376. For example, the seals 414a-b prevent fluid flow between the sensing chamber 332 and the loading chamber 328 via the bore 376 and along the second stem end 364 as the second stem end 364 slides within the bore 376. The seals 414a-b (e.g., O-rings) are disposed within respective recesses or grooves 420a-b in the inner surface 418 of the bore 376 defined or formed by the sensor guide 374 and/or the second stem end 364. The first seal assembly 412 may include retaining rings 422 (e.g., a piston ring) to retain the seals 414a-b within their respective grooves 420a-b. Additionally, to reduce friction between the second stem end 364 and the inner surface 418 of the bore 376, the first seal assembly 412 and/or pressure sensor 358 may include one or more wear rings 424.

Additionally, the sensor guide 374 includes a second seal assembly 426 (e.g., static seals or O-rings) disposed about the peripheral surface 406 of the sensor guide 374 between the stepped portions 404 of the sensor guide 374 and the respective stepped portions 408 of the regulator body 306. In particular, the second seal assembly 426 includes first and second seals 428a-b (e.g., O-rings) disposed within respective recesses or grooves 430a-b defined by the sensor guide 374 and/or the regulator body 306. The second seal assembly 426 may include a retaining ring 432 (e.g., a piston ring) to retain the seals 428a-b within their respective grooves 430a-b.

Thus, the seals 356 (FIG. 3), the seals 428a-b, the pressure sensor 358 and/or the sensor guide 374 isolate the loading chamber 328 from environmental pressures or conditions and the seals 414a-b isolate the loading chamber 328 from the fluid flow path 316. In this manner, for example, pressure fluctuations in the fluid flow path 316 and/or environmental pressure fluctuations to do not affect the pre-set load provided to the pressure sensor 358 by the load assembly 346. In other words, pressure fluctuations of the fluid flowing through the fluid flow path 316 and/or pressure conditions in the environment in which the fluid regulator 300 is used will not cause or impart a force to the pressure sensor 358 (e.g., via the loading chamber 328) that would otherwise increase the pre-set load provided by the biasing element 348.

Also, isolating the loading chamber 328 from the sensing chamber 332 prevents relatively high pressure fluid from flowing into the bonnet 304 and causing damage to the housing 302 of the fluid regulator 300 (e.g., a blowout condition) during a seal failure condition. In particular, the bonnet 304 is typically comprised of a thin-walled body due to space constraints in, for example, the well 106 described in FIG. 1.

To prevent a relatively high pressure build-up (e.g., 10,000 psi) in the loading chamber 328 in the event of a failure of one or more of the seals 414a-b and/or 428a-b, the sensor guide 374 includes a vent flow path or a blowout path or channel 434. In the illustrated example, the vent flow path 434 is disposed between the seal 414a (e.g., a lower seal) and the seal 414b (e.g., an upper seal). In the illustrated example, the vent flow path 434 of the sensor guide 374 is a plurality of vent flow paths or channels 434a-b (e.g., drill holes) radially spaced (e.g., symmetrically or asymmetrically) about the longitudinal axis 440 of the sensor guide 374. The longitudinal axis 440 of the sensor guide 374 is coaxially aligned with the longitudinal axis 360 of the housing 302. As shown, the vent flow path 434 has an axis 442 that is non-parallel relative to (e.g., is perpendicular to or intersects) the longitudinal axis 440 of the sensor guide 374.

The vent flow path 434 includes an inlet 444 in fluid communication with the outer surface 418 of the second stem end 364 and an outlet 446 in fluid communication with a vent port 448 of the housing 302. The vent port 448 fluidly couples the vent flow path 434 to the environment. In some examples, the vent port 448 can fluidly couple the vent flow path 434 to another fluid device such as, for example, a reservoir, a fluid control device, a flexible hose and/or any other fluid control device(s).

The vent port 448 is disposed between the outer surface 406 of the sensor guide 374 and the outer surface 312 of the regulator body 306. The vent port 448 of the illustrated example is a channel (e.g., an annular groove) formed around at least a portion of the inner surface 410 of the regulator body 306. For example, in the illustrated example, the vent port 448 is disposed between the stepped portions 408 of the regulator body 306 and includes an axis substantially parallel relative to and/or offset from the axis of the vent flow path 434. In some examples, the fluid regulator 300 includes a plurality of vent ports 448 radially spaced about the longitudinal axis 360 of the housing 302 that align with the respective plurality of vent flow paths 434a-b of the sensor guide 374. In some examples, an axis of the vent port 448 may be coaxially aligned with the axis 442 of the vent flow path 434 and/or may be non-parallel to the axis of the vent flow path 434. For example, the vent port 448 may be at an angle (e.g., a 45 degree angle) relative to the vent flow path 434 and/or any other direction or orientation. Similarly, the vent flow path 434 may be at an angle (e.g., a 45 degree angle) relative to an axis of the vent port 448 and/or the longitudinal axis 440 of the sensor guide.

Additionally, the example fluid regulator 300 includes a filter or seal 450 (e.g., a mesh filter, an O-ring) to prevent the ingress of particulate or dust within the fluid regulator 300 via the vent port 448. As shown, the regulator body 306 includes an annular groove 452 to receive the filter 450. The filter 450 has a relatively small or low resiliency such that it can expand, break, fracture and/or otherwise move away from the vent port 448 when a pressure of a process fluid in the sensing chamber 332 flowing through the vent port 448. Thus, as shown, the filter 450 of the illustrated example does not prevent pressurized fluid in the environment from entering the fluid regulator 300. Additionally or alternatively, the filter 450 may be disposed about the peripheral surface 406 of the sensor guide 374 adjacent the outlet 446 of the vent flow path 434 and/or any other suitable location to prevent the ingress of particulate from flowing toward the seals 418a-b and/or 428a-b. In some examples, the filter 450 may be a screen mesh that is disposed within the vent port 348 and/or the vent flow path 434. Unlike the filter 450, a screen mesh filter does not move relative to the vent port 448 when a pressure of a process fluid in the sensing chamber 332 flowing through the vent port 448.

Although the filter 450 does not prevent pressurized fluid from flowing within the vent flow path 434, the first seal assembly 412 prevents fluid from the environment from flowing to the sensing chamber 332 and the loading chamber 328 via the inlet 444 of the vent flow path 434. Similarly, the second seal assembly 426 prevents fluid from the environment from flowing to the sensing chamber 332 and the loading chamber 328 via the vent port 448 (e.g., between the outer surface 406 of the sensor guide 374 and the inner surface 410 of the regulator body 306).

Thus, in operation, the housing 302 isolates the loading chamber 328 from pressure fluctuations in the environment surrounding the fluid regulator 300. In particular, the seals 356 prevent fluid flowing to the loading chamber 328 via the housing 302. Additionally, the seals 414a-b and 428a-b prevent fluid in the sensing chamber 332 from flowing to the loading chamber 328 along the second stem end 364 of the pressure sensor 358 and/or between the inner surface 410 of the regulator body 306 and the outer surface 406 of the pressure sensor 358.

Further, in operation, the seals 414b and 428b prevent pressurized fluid in the environment from flowing to the loading chamber 328 and the seals 414a and 428a prevent pressurized fluid in the environment from flowing to the sensing chamber 332. In particular, the seal 414a provides a seal between the sensing chamber 332 and the vent flow path 434 and the seal 414b provides a seal between the vent flow path 434 and the loading chamber 328. Further, the seal 428a seals between the sensing chamber 332 and the vent port 448 and the seal 428b seals between the vent port 448 and the loading chamber 328. Thus, the loading chamber 328 of the illustrated example is isolated from pressure fluctuations in the environment and/or the process fluid in the sensing chamber 332. As a result, such pressures do not affect the accuracy of the load assembly 346 and, thus, the accuracy of the fluid regulator 300.

Further, the vent flow path 434 prevents pressure build-up of a process fluid or media in the loading chamber 328 and/or the sensing chamber 332 should one of the seals 414a-b and/or 428a-b fail during operation. In particular, fluid flowing from the sensing chamber 332 toward the loading chamber 328 via the bore 376 is vented to the environment via the vent flow path 434 and the vent port 448 before the fluid reaches the loading chamber 328. A pressure of the process fluid causes the filter 450 to move away from the vent port 448 to allow the egress of fluid from the sensing chamber 332 to the environment. In other examples, however, if the filter is mesh filter, then the pressure of the process fluid does not cause the filter to move relative to the vent port 448.

In some examples the means for controlling includes, for example, the poppet (366) that moves relative to the valve seat (342); the means for sensing includes, for example, the pressure sensor (358) that includes a surface (358*a*) that senses pressure within the sensing chamber (332) and a surface (358*b*) that senses pressure provided by the load assembly (346); the means for loading includes, for example, the biasing element (348) disposed within the loading chamber (328); the means for sealing includes, for example, the seals (356), (414) and/or (428); the means for venting includes, for example, the vent (434); and the means for filtering includes, for example, the filter (450).

Although certain apparatus, methods, and articles of manufacture have been described herein, the scope of coverage of this patent is not limited thereto. To the contrary, this patent covers all embodiments fairly falling within the scope of the appended claims either literally or under the doctrine of equivalents.

What is claimed is:

1. A fluid regulator, comprising:
    a regulator body defining a sensing chamber between an inlet and an outlet of a fluid flow passageway of the fluid regulator;
    a bonnet coupled to the regulator body, the bonnet defining a threaded aperture and a loading chamber disposed adjacent the sensing chamber, the loading chamber is sealed relative to an environment surrounding the fluid regulator, the loading chamber to receive a biasing element, the loading chamber not to be subject to a reference pressure;
    a sensor guide disposed between the sensing chamber and the loading chamber, the sensor guide having a first seal to fluidly isolate the loading chamber from the sensing chamber, the sensor guide having a vent flow path between the sensing chamber and the loading chamber to vent the sensing chamber during a failure condition of the first seal, the regulator body defining a transverse bore between an interior surface of the regulator body and an exterior surface of the regulator body, the transverse bore to align with the vent flow path to enable fluid communication therebetween, the exterior surface of the regulator body defining a groove that is partially defined by the transverse bore;
    a second seal or a filter disposed in the groove to cover an outlet of the transverse bore;
    a cap covering at least a portion of the bonnet;
    a third seal positioned between the cap and the bonnet, the third seal to enable the loading chamber to be sealed relative to the environment surrounding the fluid regulator;
    a biasing element adjuster to extend through and threadably engage the threaded aperture, the biasing element adjuster being movable to change a load imparted by the biasing element; and
    a fourth seal positioned around the biasing element adjuster immediately adjacent an end of the bonnet and an opening of the threaded aperture, the fourth seal to enable the loading chamber to be sealed relative to the environment surrounding the fluid regulator.

2. A fluid regulator of claim 1, wherein the groove is a first groove; and
    further comprising a second groove defined by an external surface of the bonnet, a sixth seal to be disposed within the second groove and to surround the external surface of the bonnet, the sixth seal being disposed between the bonnet and the regulator body to enable the loading chamber to be sealed relative to the environment.

3. A fluid regulator of claim 1, wherein the second seal or filter is to prevent an ingress of particulate into the vent flow path.

4. A fluid regulator of claim 1, wherein the vent flow path of the sensor guide has an axis that is substantially perpendicular to a longitudinal axis of the regulator body.

5. A fluid regulator of claim 1, wherein the sensor guide includes an aperture to slidably receive at least a first portion of a pressure sensor, wherein the aperture has an axis that is non-parallel relative to an axis of the vent flow path.

6. A fluid regulator of claim 1, wherein the first seal provides a seal between the sensing chamber and the vent flow path.

7. A fluid regulator of claim 6, further comprising a fifth seal to seal between the vent flow path and the loading chamber.

8. A fluid regulator of claim 6, further comprising a first outer seal disposed about a peripheral surface of the sensor guide to seal between the sensing chamber and the vent flow path of the regulator body and a second outer seal disposed about the peripheral surface of the sensor guide to seal between the vent flow path and the loading chamber.

9. A fluid regulator of claim 1, wherein the sensor guide comprises a cylindrical body and the vent flow path comprises a plurality of vent fluid paths radially spaced relative to a longitudinal axis of the sensor guide.

10. A fluid regulator, comprising:
    a regulator body comprising a sensing chamber and a loading chamber, the loading chamber to receive a biasing element and to be isolated from an environment surrounding the fluid regulator, the loading chamber not to be subject to a reference pressure, the regulator body defining a transverse bore between an interior surface of the regulator body and an exterior surface of the regulator body, the exterior surface of the regulator body defining a groove that is partially defined by the transverse bore;
    a first seal or a filter disposed in the groove to cover an outlet of the transverse bore;
    a cap to cover a portion of the regulator body defining the loading chamber;
    a second seal disposed between the cap and the regulator body, the second seal to enable the loading chamber to be sealed relative to the environment surrounding the fluid regulator;
    a sensor guide disposed between the sensing chamber and the loading chamber;
    a third seal disposed between a vent flow path and the loading chamber to prevent fluid flow to the loading chamber; and
    a fourth seal disposed between the vent flow path and the sensing chamber to prevent fluid flow between the sensing chamber and the vent flow path.

11. A fluid regulator of claim 10, wherein the vent flow path is to vent a pressurized fluid within the sensing chamber to the environment surrounding the regulator body when the third seal is in a fail condition.

12. A fluid regulator of claim 10, further comprising a fifth seal disposed about a peripheral surface of the sensor guide to prevent fluid flow between the transverse bore and the loading chamber and a sixth seal disposed about the peripheral surface of the sensor guide to prevent fluid flow between the transverse bore and the sensing chamber.

13. A regulator of claim 12, wherein the vent flow path is disposed between the third and fourth seals and the fifth and sixth seals.

14. A fluid regulator of claim 12, wherein the vent flow path is to vent a pressurized fluid within the sensing chamber to the environment surrounding the regulator body when the sixth seal is in a fail condition.

15. A fluid regulator of claim 10, wherein the first seal or the filter disposed adjacent the transverse bore is to prevent an ingress of particulate into the vent flow path.

16. A fluid regulator of claim 10, further comprising a pressure sensor slidably coupled to an aperture of the sensor guide, the aperture being coaxially aligned with a longitudinal axis of the sensor guide.

17. A fluid regulator of claim 16, wherein the pressure sensor is movable within the aperture between a first position and a second position based on a force differential provided across a first pressure sensing area of the pressure sensor in communication with the sensing chamber and a second pressure sensing area of the pressure sensor in communication with the loading chamber.

18. A fluid regulator of claim 10, wherein the third and fourth seals prevent fluid flow from the environment surrounding the fluid regulator to the loading chamber or the sensing chamber via the vent flow path.

19. A fluid regulator, the regulator having a regulator body to define a fluid flow passageway between an inlet and an outlet, comprising:

means for controlling fluid flow or pressure within the fluid flow passageway of the regulator between the inlet and the outlet;

means for sensing a pressure of a fluid in a sensing chamber operatively coupled to the means for controlling fluid flow, the means for sensing being disposed between the inlet and the outlet;

means for loading adjacent the means for sensing the pressure, the means for loading not to be subject to a reference pressure and to be isolated from an environment surrounding the fluid regulator;

means for sealing the means for loading from the sensing chamber and the environment surrounding the regulator body comprising a cap covering a portion of a bonnet and a seal disposed between the cap and the bonnet; and means for venting disposed between the means for sealing and the means for loading, wherein the means for venting is to vent a pressurized fluid in fluid communication with the means for sensing to the environment when the means for sealing is in a fail condition, the means for venting include a transverse bore between an interior surface of the regulator body and an exterior surface of the regulator body, a seal or a filter at least partially surrounding the exterior surface and covering an opening of the transverse bore to substantially prevent ingress of particulate in to the means for venting.

20. A fluid regulator of claim 19, wherein the seal or the filter fully surrounds the exterior surface.

* * * * *